A. ROOS.

Beer-Cooler.

No. 8,420. Reissued Sept. 17, 1878.

Witnesses

Otto Schyland.

W. C. Hauff

Inventor.

August Roos.

by

Van Santvoord & Hauff his attorneys

N. PETERS, PHOTO-LITHOGRAPHER, WASHINGTON, D. C.

UNITED STATES PATENT OFFICE.

AUGUST ROOS, OF NEW YORK, N. Y.

IMPROVEMENT IN BEER-COOLERS.

Specification forming part of Letters Patent No. 164,040, dated June 1, 1875; Reissue No. 8,120, dated September 17, 1878; application filed July 17, 1878.

*To all whom it may concern:*

Be it known that I, AUGUST ROOS, of the city, county, and State of New York, have invented a new and useful Improvement in Beer-Coolers, which improvement is fully set forth in the following specification, reference being had to the accompanying drawing, in which—

Figure 1:
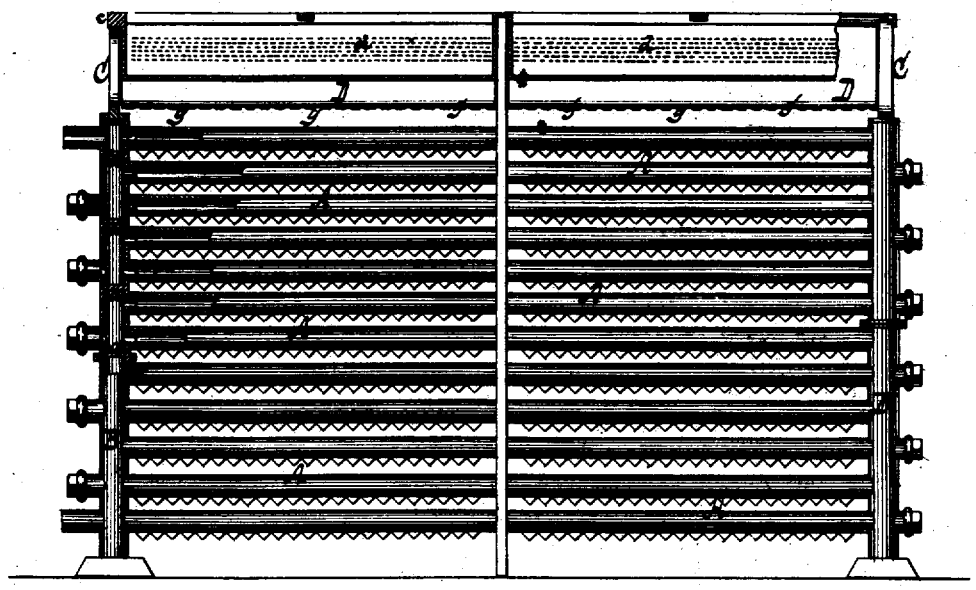
Figure 2:
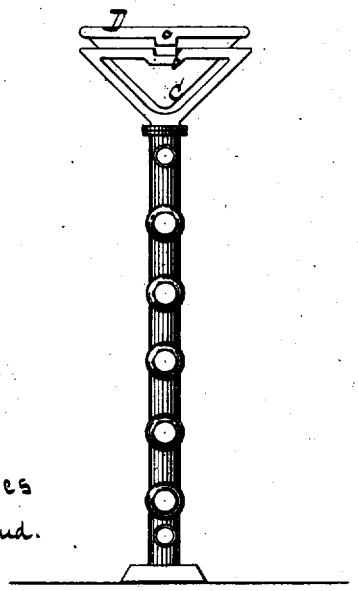
Figure 3:
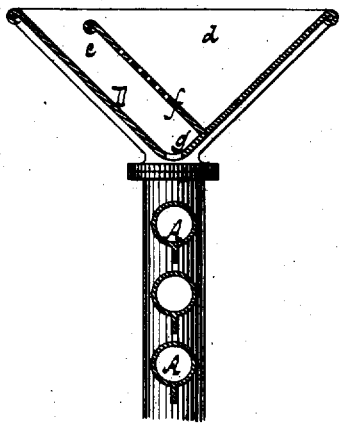

Figure 1 represents a sectional front view of a cooler embracing my invention. Fig. 2 is an end view thereof. Fig. 3 is a cross-section of the same.

Similar letters indicate corresponding parts.

My invention consists, first, in a V-shaped trough, having its lower extremity perforated, and said trough being provided with a partition projecting directly from one of its inclined walls above its lower extremity, and standing approximately parallel with the other wall, the upper portion of said partition being foraminous, in combination with a vertical series of cooling-pipes, having their axes in the same vertical plane with the perforated lower extremity of said trough, whereby the liquid to be cooled is freed of solid matters or impurities, and is caused to discharge from the trough simultaneously at every point along its entire length, while it is caused to trickle down evenly on opposite sides of the cooling-pipes as it discharges from the trough, the entire inner surface of the latter, moreover, being exposed, and the least expense being incurred in its production.

In the drawing, the letters A A designate a series of horizontal pipes, which are arranged in a corresponding vertical plane to each other, the same being supported at their opposite ends by columns B B. These columns are hollow, and they are cast in sections, which are united by flanges and screws or other suitable means, so that the apparatus can be readily put up and taken apart, as may be desired.

The immediate supports for the pipes A A consist of lateral sockets or nipples formed on the columns B B, and opposite to these sockets or nipples are hand-holes, closed by screw-plugs or other suitable means, so that easy access can be had to the interior of the pipes for the purpose of cleaning.

When the pipes A and columns B are united the external surface of the apparatus is free from projections, and it can easily be kept clean, which is an essential desideratum, particularly when the apparatus is to be used for cooling beer.

In the interior of the columns B B are horizontal partitions *a*, so placed that the cooling medium is compelled to flow through the pipes A A in a zigzag course. These partitions are cast with the columns.

From the upper ends of the columns B B rise standards C C, which are provided with flat notches or recesses *b*, (see Fig. 2,) for the reception of lugs *c*, which project from the ends of the distributing trough or troughs D.

If the pipes A A are of considerable length, two or more such troughs are used, as shown in Fig. 1, so that each trough can be readily handled.

I make the trough D V-shaped, and provide the same with a partition, *f*, whereby the same is divided into two compartments, *d e*. The partition *f* runs parallel, or nearly so, to one of the sides of the trough D, and its upper part is foraminous—that is to say, the holes in the partition begin at some distance above its lower edge, where it is united with the trough—so that the liquid poured into the compartment *d* runs into the compartment *e*, and is freed of solid matters or impurities in its passage, while, by the peculiar arrangement of the holes in the partition *f*, the liquid is caused to spread through the entire length of the trough before it passes through such holes into the discharge-compartment *e*, the effect of which is that the liquid discharges from the trough simultaneously at every point along its entire length. The partition *f* can be readily applied, and by its use the interior of the trough D is laid bare, so that it can be cleaned without difficulty.

The liquid discharges from the trough D through perforations *g*, which are formed at its lower extremity, or, in other words, in the corner of the discharge-compartment *e*, and the trough is so arranged that these perforations are in a vertical plane with the axes of the pipes A, whereby the liquid is caused to trickle down evenly on opposite sides of these pipes.

All difficulty in adjusting the trough D so as to bring its perforations in a vertical plane with the axes of the pipes A is overcome by providing the trough with the lugs *c*, and combining therewith the notched standards C, the trough being thereby rendered removable from the apparatus, and being caused to adjust itself in the appropriate position when put in place.

I am aware that it is not new to construct a beer-cooler with a trough having a foraminous partition, and having slots in one of its sides for discharging the liquid. The disadvantage of this trough is that, when the pressure of the liquid is great, the liquid is liable to shoot over the cooling-pipes as it discharges from the trough, while, when the pressure of the liquid becomes reduced, it is liable to trickle down only on that side of the pipes nearest the trough.

I am also aware that it is not new to use two troughs, both having a V shape, and arranged one within the other, one side of the inner trough being foraminous. The disadvantage of this latter arrangement is that it causes an uneven discharge of the liquid, and also renders the apparatus expensive.

What I claim as new, and desire to secure by Letters Patent, is—

1. The beer-cooler distributing-trough herein described, consisting of a V-shaped trough having its lower extremity perforated, and said trough being provided with a partition projecting directly from one of its inclined walls above its lower extremity and standing approximately parallel with the other wall, the upper portion of said partition being foraminous, in combination with a vertical series of cooling-pipes having their axes in the same vertical plane with the perforated lower extremity of said trough.

2. A sectional beer-cooler consisting of the horizontal tubes A and sectional columns B, having flanges, for the purpose of connecting together a number of said sections, substantially as and for the purpose herein set forth.

In testimony that I claim the foregoing I have hereunto set my hand and seal this 12th day of July, 1878.

AUGUST ROOS. [L. S.]

Witnesses:
W. HAUFF,
E. F. KASTENHUBER.